United States Patent
Brk

(10) Patent No.: US 11,378,137 B2
(45) Date of Patent: Jul. 5, 2022

(54) DRIVE TRAIN WITH THERMAL OVERLOAD SAFEGUARD

(71) Applicant: Bayerische Motoren Werke Aktiengesellschaft, Munich (DE)

(72) Inventor: Nikola Brk, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 346 days.

(21) Appl. No.: 16/666,725

(22) Filed: Oct. 29, 2019

(65) Prior Publication Data

US 2020/0063803 A1 Feb. 27, 2020

Related U.S. Application Data

(63) Continuation of application No. PCT/EP2018/061940, filed on May 9, 2018.

(30) Foreign Application Priority Data

May 22, 2017 (DE) .................. 10 2017 208 668.8

(51) Int. Cl.
F16D 9/02 (2006.01)
F16D 9/06 (2006.01)

(52) U.S. Cl.
CPC ...... *F16D 9/02* (2013.01); *F16D 9/06* (2013.01)

(58) Field of Classification Search
CPC ..................................... F16D 9/02; F16D 9/06
USPC ...................................................... 464/31, 33
See application file for complete search history.

(56) References Cited

U.S. PATENT DOCUMENTS

| 2,140,723 | A | * | 12/1938 | Spicer ................ F16D 9/02 464/31 |
| 3,064,454 | A | | 11/1962 | Sharples |
| 3,889,789 | A | | 6/1975 | Boehringer |
| 4,086,991 | A | * | 5/1978 | Swadley .............. F16D 9/02 464/31 |
| 4,125,180 | A | * | 11/1978 | Roberts ............... F16D 43/25 464/31 |
| 4,385,894 | A | | 5/1983 | Sharpe et al. |
| 5,248,953 | A | | 9/1993 | Hoenl |
| 2007/0251228 | A1 | | 11/2007 | Frank et al. |

FOREIGN PATENT DOCUMENTS

| CN | 1067526 A | 12/1992 |
| CN | 1898478 A | 1/2007 |
| CN | 101255895 A | 9/2008 |

(Continued)

OTHER PUBLICATIONS

Chinese-language Office Action issued in Chinese Application No. 201880020109.8 dated Jul. 20, 2021 with English translation (12 pages).

(Continued)

*Primary Examiner* — Greg Binda
(74) *Attorney, Agent, or Firm* — Crowell & Moring LLP

(57) ABSTRACT

A drive train includes a drive element, an output element and a thermal overload safeguard. The thermal overload safeguard is configured in such a way that there is a connection between the drive element and the output element below a critical temperature, and the drive element and the output element are decoupled mechanically from one another above the critical temperature.

13 Claims, 2 Drawing Sheets

(56) References Cited

FOREIGN PATENT DOCUMENTS

| | | |
|---|---|---|
| CN | 102518692 A | 6/2012 |
| CN | 204344847 U | 5/2015 |
| DE | 27 36 636 A1 | 2/1978 |
| EP | 0 869 290 A1 | 10/1998 |
| FR | 1 061 450 A | 4/1954 |

OTHER PUBLICATIONS

International Search Report (PCT/ISA/210) issued in PCT Application No. PCT/EP2018/061940 dated Sep. 11, 2018 with English translation (six (6) pages).
German-language Search Report issued in counterpart German Application No. 10 2017 208 668.8 dated May 22, 2018 with partial English translation (13 pages).
Chinese-language Office Action issued in Chinese Application No. 201880020109.8 dated Mar. 1, 2021 with English translation (14 pages).

\* cited by examiner

DRIVE TRAIN WITH THERMAL OVERLOAD SAFEGUARD

CROSS REFERENCE TO RELATED APPLICATIONS

This application is a continuation of PCT International Application No. PCT/EP2018/061940, filed May 9, 2018, which claims priority under 35 U.S.C. § 119 from German Patent Application No. 10 2017 208 668.8, filed May 22, 2017, the entire disclosures of which are herein expressly incorporated by reference.

BACKGROUND AND SUMMARY OF THE INVENTION

The present invention relates to a drive train.

Overload couplings known from the prior art, which are disposed in the load flow of a drive, act upon torque overload such that said overload couplings are triggered in the event of mechanical overload. To the extent of a preset limit torque having been reached, said overload couplings decouple a drive input element from a drive output element and thus prevent damage. For example, such known overload couplings have shear pins which break in the event of mechanical overload, thus when the preset limit torque is reached or exceeded. Slipping overload couplings are furthermore known. Such couplings can have balls which transmit the torque and beyond a specific torque are pushed out of the seat of said balls counter to a spring force and cause decoupling. Alternatively, such couplings can transmit the torque in a friction-fitting manner, wherein slippage between torque transmission elements that are connected in a friction-fitting manner arises in the event of overload. If the drive train during operation is exposed to critical operating states, for example is thermally stressed, a component of the drive train, in particular a bearing or a toothing, can already fail before the preset limit torque has been reached. A failure of the drive train can arise on account thereof despite the overload coupling, since the overload coupling is triggered exclusively upon reaching the preset limit torque.

It is therefore an object of the present invention to provide a drive train having a protection mechanism which effectively prevents a failure even in the case of critical operating states.

The object is achieved by a drive train having a drive input element, a drive output element, and a thermal overload safeguard. The thermal overload safeguard is configured in such a manner that there is a connection between the drive input element and the drive output element below a critical temperature, and the drive input element and the drive output element are mutually mechanically decoupled above the critical temperature. For example, there is a form-fitting and/or a force-fitting connection between the drive input element and the drive output element.

The basic concept of the invention lies in that a transmission of motion from the drive input element to the drive output element depends on an ambient temperature in the drive train. Accordingly, the thermal overload safeguard interrupts the torque transmission by way of the drive train by virtue of an excessively high temperature by virtue of which damage in the drive train can potentially arise. Safety-critical blocking is prevented by the mechanical decoupling above a critical temperature, on account of which damage in the drive train can be prevented. It is ensured that the components of the drive train by virtue of the thermal stress are not weakened in such a manner that said components by virtue of the acting forces are already damaged prior to reaching a torque overload safeguard. In general, the thermal overload safeguard thus protects the drive train from overheating, this arising in the event of an absent lubrication, for example. A cost-effective possibility for effectively protecting a drive train is thus achieved. The critical temperature can correspond to an annealing temperature in the tempering process of a metal, or to a melting temperature of a plastics material.

The drive train is in particular a drive train of a motor vehicle.

The drive input element, the drive output element, as well as the thermal overload safeguard can be component parts of a gearbox. A torque to be geared, for example from a motor of the motor vehicle, can bear on the drive input element.

The drive input element and the drive output element can be configured in such a manner that a torque can be transmitted from the drive input element to the drive output element. The drive input element can preferably transmit a torque to the drive output element which converts the torque and transmits the latter to at least one further element, for example to a road wheel of the motor vehicle.

The transmission of the torque from the drive input element to the drive output element can be performed by way of the thermal overload safeguard by virtue of a form-fitting and/or force-fitting connection.

According to one embodiment, the overload safeguard is configured as a thermal coupling, in particular as a thermal overload coupling. To this extent, said overload safeguard can assume an opened position in which no torque is transmitted, and a closed position in which a torque is transmitted. The thermal coupling furthermore ensures that said thermal coupling can rapidly react to changing temperatures so that the thermal coupling is triggered when the critical temperature has been reached or exceeded.

In the normal operation of a motor vehicle a temperature which is below the critical temperature preferably prevails in the environment of the drive train. However, in the event of malfunctions or faults in the operation, for example in the event of an absent lubrication, it can arise that the temperature climbs beyond the critical temperature. This is also referred to as a critical operating state.

A fluid, for example a lubricating oil or transmission oil, respectively, is usually used for reducing the friction and for discharging the thermal loss output in the environment of the drive train. In the case of demanding environmental conditions, fluids of a comparatively high viscosity, such as lubricating greases, are also utilized in order for components to be additionally shielded, for example from dirt.

According to one embodiment, the thermal overload safeguard can comprise at least one thermal securing element. The function of the thermal overload safeguard can be provided by way of the thermal securing element. The at least one thermal securing element can act in the circumferential direction or in the axial direction.

A plurality of securing elements which, for example, have different effective directions are in particular provided.

In order for the drive input element and the drive output element to be mechanically decoupled above the critical temperature, the thermal securing element can be configured in such a manner that said thermal securing element varies the mechanical properties thereof above the critical temperature. For example, the securing element loses strength above the critical temperature such that said securing element becomes resilient or can be bent, respectively.

The securing element can be configured as a pin, in particular as a threaded pin, or as a spring. Such securing elements are producible in a particularly simple and cost-effective manner, on account of which the production and repair costs for the thermal overload safeguard are minor, to the extent that the thermal overload safeguard has been triggered.

For example, the securing element melts above the critical temperature. The securing element thus initially loses strength, on account of which the thermal overload safeguard is triggered. According to a further aspect of the invention, the securing element can be configured in such a manner that said securing element breaks above the critical temperature and a predefined force. The drive train on account of the thermal overload safeguard thus has a thermal predetermined breaking point, since the thermal overload safeguard breaks above the critical temperature.

Alternatively or additionally, the volume of the securing element can decrease or increase above the critical temperature. For example, the securing element is configured as an expandable material element which contracts above the critical temperature. Alternatively, the securing element can expand above the critical temperature.

The securing element is in particular thermally reversible. As soon as the temperature sinks to below the critical temperature, the securing element returns to the original state thereof.

For example, the at least one securing element has a memory shape alloy such that said securing element always returns to the initial shape thereof when the temperature sinks below the critical temperature.

The at least one thermal securing element can be disposed between the drive input element and the drive output element. On account thereof, the at least one thermal securing element can ensure a mechanical, in particular form-fitting, connection between the drive input element and the drive output element. The at least one thermal securing element is in particular disposed so as to be in the radial direction between the drive input element and the drive output element.

Alternatively, the at least one securing element can act in the axial direction on the drive input element or the drive output element. For example, in the case of a claw coupling, the at least one thermal securing element can act axially against at least one claw which by way of a spring element, in particular a plate spring or a coil spring, attempts to disengage in a self-acting manner.

Alternatively thereto, the spring element can be dispensed with when the at least one claw has chamfers such that said claw by virtue of the drive rating disengages in a self-acting manner, to the extent that the thermal overload safeguard has been triggered.

A torque flow in the drive train is in particular mechanically interrupted above the critical temperature. On account thereof, the advantage that components of the drive train are protected, in particular against mechanical overload, can be achieved. To this extent, the thermal overload safeguard protects against mechanical overload, since said thermal overload safeguard mechanically interrupts the torque flow.

A further advantage of the invention lies in that only the thermal securing element has to be replaced in the event of a repair to the drive, to the extent that said thermal securing element has been damaged or destroyed in the triggering of the thermal overload safeguard. On account thereof, the costs and the investment in terms of labor for the repair remain low.

The thermal securing element can comprise a plastics material, a metal, or an expandable material, in particular can be composed of one of said materials. The thermal securing element can furthermore be composed of a combination of two or more of said materials.

According to one embodiment, the drive train can have an overload securing unit so as to decouple in the event of thermal overload as well as in the event of mechanical overload. For example, the thermal overload safeguard can be configured in such a manner that the drive input element and the drive output element are mechanically decoupled not only above a critical temperature but also below a critical temperature above a predefined force or a predefined torque, respectively. It can be ensured on account thereof that no safety-critical blocking arises either in the event of thermal overload or else in the event of mechanical overload. A force at which the securing element breaks below the critical temperature is preferably greater than a force at which the securing element breaks above the critical temperature. For example, the securing element melts above the critical temperature and below the critical temperature breaks at a defined force which acts on the securing element.

According to one further embodiment of the invention, the drive train can have at least one thermal overload safeguard and additionally at least one mechanical overload safeguard, for example a torque overload safeguard. The overload safeguard unit, apart from the thermal overload safeguard, in this instance comprises the mechanical overload safeguard, in particular the torque overload safeguard.

The drive input element is preferably a shaft. However, the drive input element can also be configured as a drive input sprocket, a piston, or similar.

The drive output element can be configured as a hub. However, the drive output element can alternatively also be configured as a sprocket, a shaft, for example a crankshaft, or similar.

The use of the overload safeguard for an application in a motor vehicle is described above. However, the overload safeguard can also be applied in many other sectors, for example in the case of pumps, tool spindles, or other components that carry an output.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
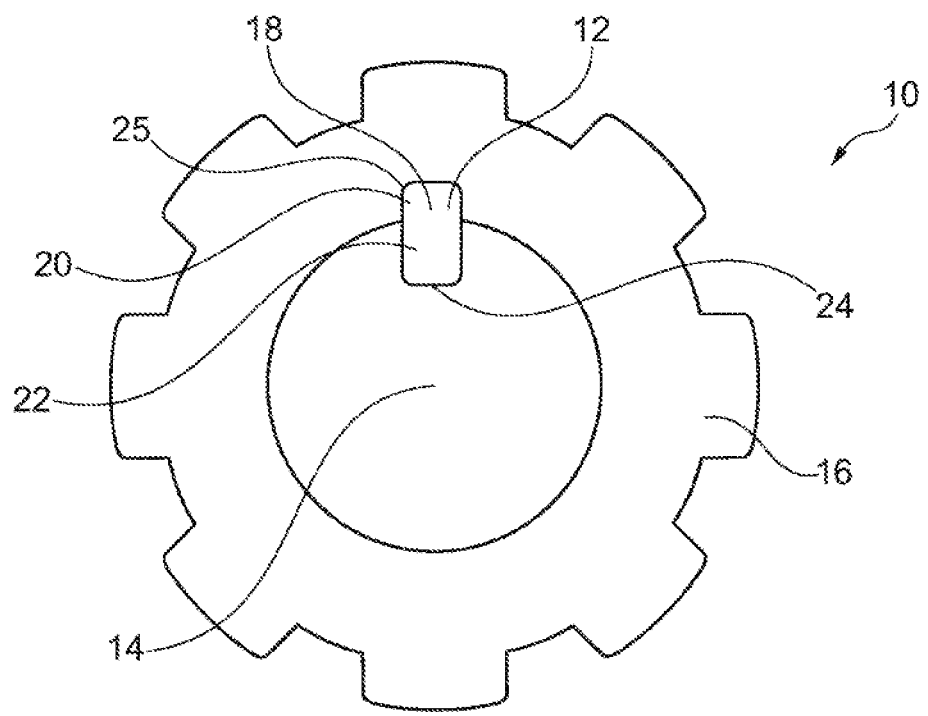
FIG. 1 is a schematic sectional illustration of a drive train according to the invention, having a thermal overload safeguard according to a first embodiment.

FIG. 1 schematically shows a cross-section through a drive train 10 for transmitting a torque. The drive train is a drive train of a motor vehicle, for example, thus a motor vehicle drive train.

The drive train 10 has a thermal overload safeguard 12, a drive input element 14, and a drive output element 16. The drive input element 14 according to the embodiment shown in FIG. 1 is configured as a shaft, whereas the drive output element 16 is configured as a hub.

The thermal overload safeguard 12 configures a thermal coupling 18, in particular a thermal overload coupling which is provided between the drive input element 14 and the drive output element 16.

The thermal overload safeguard 12 in the embodiment shown comprises a thermal securing element 20 which acts in the radial direction between the drive input element 14 and the drive output element 16. The drive input element 14 by way of the thermal securing element 20 is connected in a force-fitting manner to the drive output element 16, wherein a form-fit can be present in each case between the drive input element 14 and the securing element 20 as well as between the drive output element 16 and the securing element 20. The thermal securing element 20 is moreover disposed, in particular in the radial direction, between the drive input element 14 and the drive output element 16.

The thermal securing element 20 is configured as a spring 22, in particular as a feather key. The drive input element 14 as well as the drive output element 16 have in each case one receptacle 24, 25 in which the securing element 20 is received, in particular can engage, in a form-fitting manner, such that a torque can be transmitted from the drive input element 14 to the drive output element 16.

In the event of thermal overload, in particular when exceeding a critical temperature, the securing element 20 configured as the spring 22 can vary the mechanical properties thereof. The spring 22 herein, by virtue of the varied mechanical properties thereof, can lose strength, on account of which shear forces that arise can at least partially shear off the spring 22. This leads to the thermal coupling 18 being triggered, on account of which the torque transmission is mechanically interrupted. Consequently, the drive input element 14 and the drive output element 16 are mechanically decoupled. It can be prevented on account thereof that further elements of the drive train 10, said elements being connected to the drive output element 16, for example, are damaged.

Alternatively, the securing element 20 can be configured as a pin 26 which likewise varies the mechanical properties thereof above the critical temperature. For example, the pin 26 loses strength such that said pin breaks to the extent that a (pre-)determined force acts on the pin 26.

Furthermore, the securing element 20 can even melt above the critical temperature. In order for the coupling 18, or the thermal overload safeguard 12, respectively, to be repaired after reaching or exceeding the critical temperature, it suffices for the securing element 20 to be replaced. On account thereof, a repair in the event of thermal overload is particularly simple and cost-effective.

Alternatively or additionally it can be provided that the securing element 20 varies the volume thereof above the critical temperature. The securing element 20 herein can return in a reversible manner to the original shape thereof, for example by virtue of a memory shape alloy such that a repair is not necessarily required.

Independently of the type of the securing element 20, it is ensured by virtue of the thermal overload safeguard 12 that a torque flow by way of the drive input element 14 and the drive output element 16, thus in the drive train 10, is mechanically interrupted to the extent that the critical temperature has been reached or exceeded.

Figure 2:
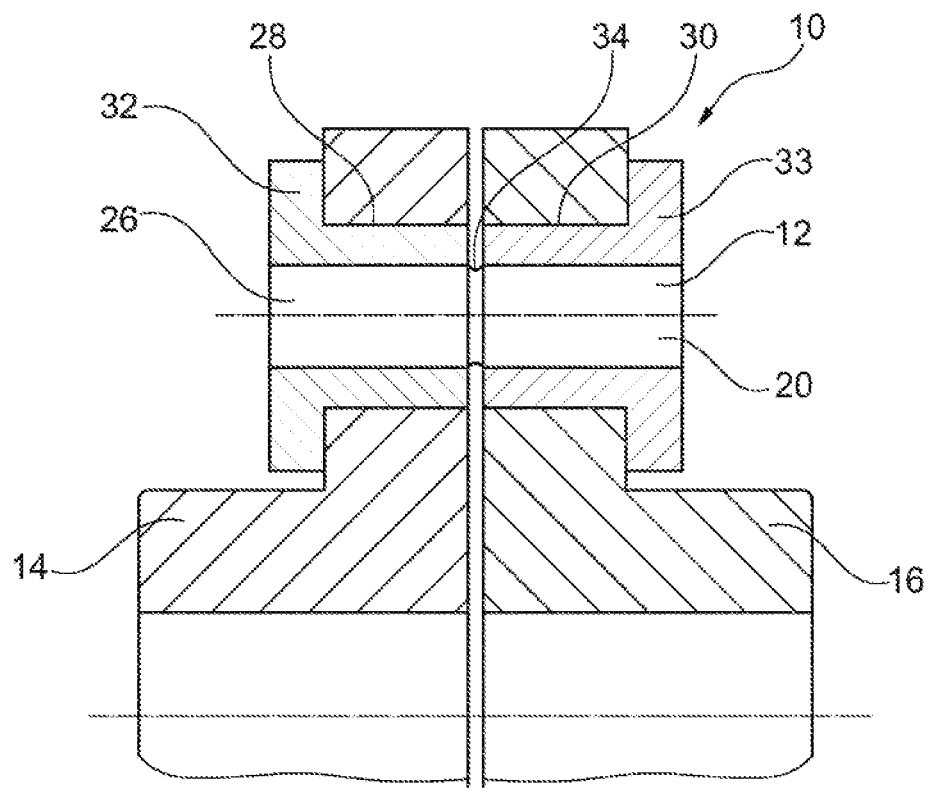
FIG. 2 is a schematic sectional illustration of a drive train according to the invention, having a thermal overload safeguard according to a second embodiment.

FIG. 2 shows a detail from a drive train 10 according to a second embodiment, in a sectional illustration.

In the embodiment illustrated in FIG. 2, the drive input element 14 and the drive output element 16 are in each case configured as a flanged hub, the latter being disposed on a shaft end (not illustrated), for example.

The thermal overload safeguard 12 has the thermal securing element 20 which in the embodiment shown is configured as a pin 26, in particular as a shear pin. The drive input element 14 and the drive output element 16 have in each case at least one bore 28, 30. The securing element 20 is disposed within the bores 28, 30. On account thereof, the drive input element 14 and the drive output element 16 are mutually connected in a force-fitting manner such that a torque can be transmitted from the drive input element 14 to the drive output element 16. A hardened sleeve 32, 33 can optionally be disposed within each of the bores 28, 30.

The securing element 20 has a material weakening 34, for example a notch, which serves as a predetermined breaking point. When the securing element 20 loses strength in the event of thermal overload, said securing element 20 can break along the predetermined breaking point.

The thermal securing element 20 shown in FIG. 2 can however also be configured in such a manner that said thermal securing element 20 melts in the event of thermal overload and in the event of mechanical overload breaks along the predetermined breaking point.

Figure 3:
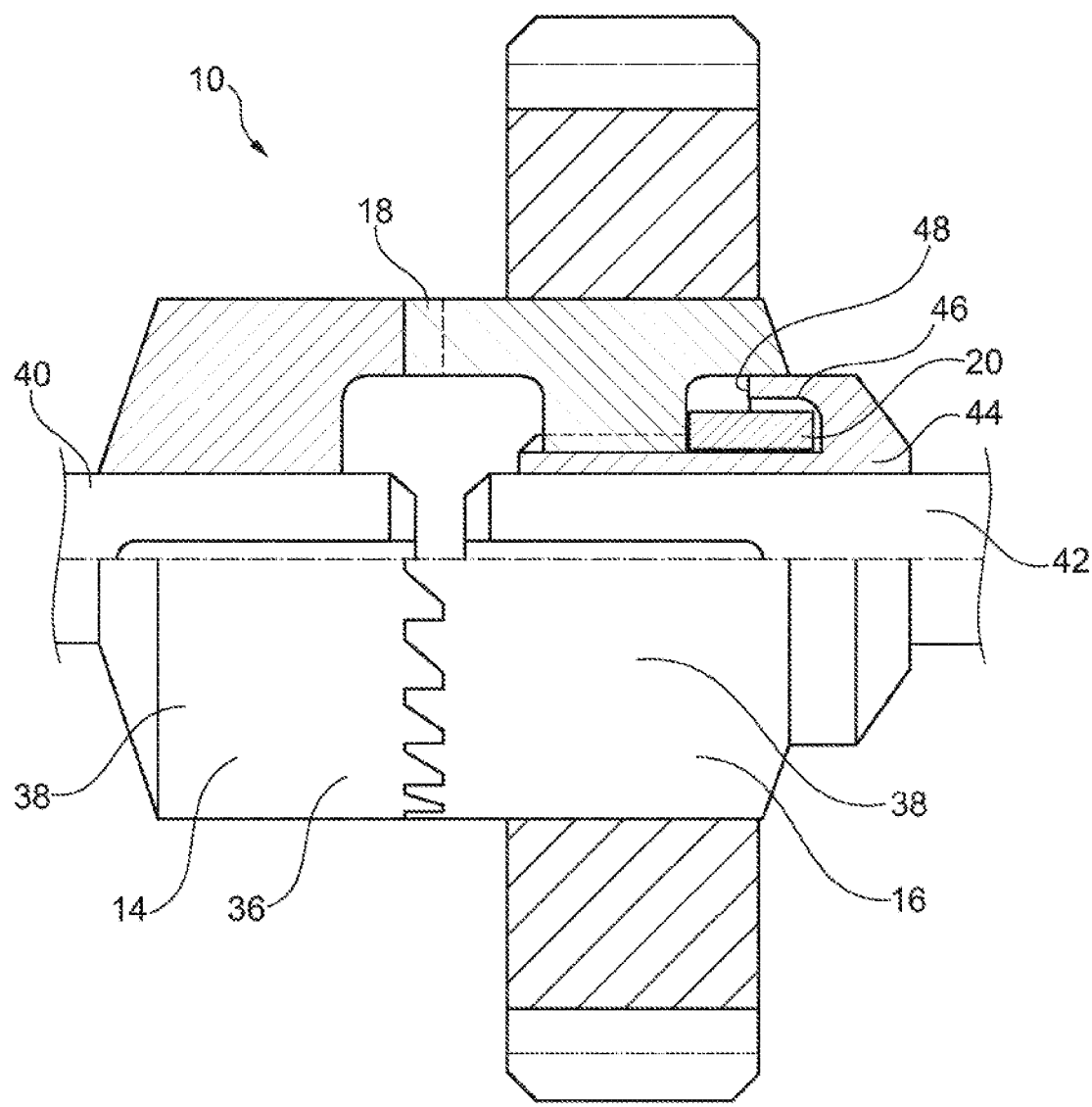
FIG. 3 is a schematic sectional illustration of a drive train according to the invention, having a thermal overload safeguard according to a third embodiment.

FIG. 3 shows part of a drive train 10 according to a third embodiment, said drive train 10 having a claw coupling 36. The drive input element 14 and the drive output element 16 are in each case configured as claws 38 having a helical toothing, wherein the teeth mesh in the orderly operation. The drive input element 14 and the drive output element 16 can be connected in a force-fitting manner by shrink-fitting, or in a form-fitting manner by means of a feather key or similar, to a shaft 40, 42.

The drive input element 14 and the drive output element 16 are kept so as to mutually engage by way of a thermal securing element 20. The securing element 20 is disposed on the drive output element 16 and impinges the drive output element 16 in the axial direction. The securing element 20 can also be disposed at other positions in the drive train 10, for example in front of the drive input element 14, as long as the drive input element 14 and the drive output element 16 in the form-fit are impinged by the securing element 20.

In general, the axial direction is considered to be the direction along which the shafts 40, 42 extend.

The axial direction accordingly defines the rotation axis of the drive input element 14 and the drive output element 16.

The drive train 10 shown in FIG. 3 has a holding element 44. The holding element 44 can be shrink-fitted to the shaft 42 or be connected to the latter in another way. The drive output element 16 and the holding element 44 are movable relative to one another, in particular wherein the drive output element 16 is movable in the axial direction.

The securing element 20 is disposed between the drive output element 16 and the holding element 44. The holding element 44 in the axial direction has a depression 46.

In the normal operation of the drive train 10, in particular when a temperature in the drive train is below the critical temperature, the securing element 20 is in part disposed in the depression 46 and in part outside the depression 46. The securing element 20 pushes the drive output element 16 against the drive input element 14 such that said drive output element 16 and said drive input element 14 are held in a mesh engagement, thus in a form-fit. The drive train 10 in FIG. 3 is illustrated in a state during the normal operation.

When the temperature within the drive train 10 climbs beyond the critical temperature, the securing element 20 can vary in the volume thereof or the mechanical properties thereof, for example melt, lose strength, or break. On account thereof, the drive output element 16 can release itself from the mesh engagement with the drive input element 14 and, in the axial direction on the holding element 44, move in the axial direction, said holding element 44 simultaneously serving as a guiding element.

In particular, the drive output element 16 in the mechanically decoupled state on the holding element 44 moves in a reciprocating manner between the drive input element 14 and a detent 48 of the holding element 44. When the drive output element 16 impacts the detent 48, the drive input element 14 and the drive output element 16 are mechanically completely decoupled.

By virtue of the helical toothing of the claws illustrated, no spring element is required for mutually decoupling the drive input element 14 and the drive output element 16; in this case, the coupling 18, 36 is automatically destressed by virtue of the acting torque.

The securing element 20 can furthermore also be configured as a spring which pushes the drive output element 16 into the coupled position, wherein the spring force decreases as the temperature increases such that the coupling 18, 36 is automatically decoupled by virtue of the acting torque. The spring can be configured from an expandable material.

However, alternative design possibilities in which the mechanical decoupling of the drive input element 14 and the drive output element 16 is supported by a spring element are also conceivable. For example, said spring element is a tension spring which actively decouples the drive output element 16 to the extent that the securing element 20 varies the mechanical properties thereof, such that the tension force exceeds the holding force of the securing element 20.

The drive output element 16 does not necessarily have to be mounted on the holding element 44; said drive output element 16 can also be mounted so as to slide directly on the shaft 42.

In an alternative embodiment, the drive input element 14 can be mounted in a sliding manner, and the drive output element 16 in terms of the axial direction or longitudinal direction of the drive train 10, can be positionally fixed.

In general, the securing element 20 in the case of the embodiment shown in FIG. 3 does not lie in the force flow.

By way of the thermal overload safeguard 12, a mechanical connection can be established between the drive input element 14 and the drive output element 16.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A drive train, comprising:
a drive input element;
a drive output element; and
a thermal overload safeguard, wherein
the thermal overload safeguard is configured such that there is a connection between the drive input element and the drive output element below a critical temperature, and the drive input element and the drive output element are mutually mechanically decoupled above the critical temperature,
wherein the thermal overload safeguard comprises at least one thermal securing element further comprising at least one pin, the at least one pin comprising a notch configured as a predetermined breaking point of the pin.

2. The drive train according to claim 1, wherein the overload safeguard is a thermal coupling which is disposed between the drive input element and the drive output element.

3. The drive train according to claim 1, wherein the thermal securing element varies the mechanical properties thereof above the critical temperature.

4. The drive train according to claim 1, wherein the at least one pin melts above the critical temperature.

5. The drive train according to claim 1, wherein the at least one pin breaks at the predetermined breaking point above the critical temperature and a predefined force.

6. The drive train according to claim 1, wherein a volume of the thermal securing element decreases above the critical temperature.

7. The drive train according to claim 1, wherein a torque flow in the drive train is mechanically interrupted above the critical temperature.

8. The drive train according to claim 1, wherein the drive input element is configured as a shaft and the drive output element is configured as a hub.

9. The drive train according to claim 1, wherein
the at least one pin is configured to break at the predetermined breaking point in response to a first predefined force applied to the at least one pin below the critical temperature,
the at least one pin is configured to break at the predetermined breaking point in response to a second predefined force applied to the at least one pin above the critical temperature, and
wherein the first predefined force is greater than the second predefined force.

10. The drive train according to claim 1, wherein
the drive input element comprises a first bore,
the drive output element comprises a second bore, and
wherein the at least one pin is disposed in both the first bore and the second bore.

11. The drive train according to claim 10, further comprising
a first hardened sleeve disposed in the first bore and surrounding a first end of the at least one pin on a first side of the notch; and
a second hardened sleeve disposed in the second bore and surrounding a second end of the at least one pin on a second side of the notch.

12. The drive train according to claim 1, wherein the notch is located at a position between the drive input element and the drive output element.

13. The drive train according to claim 1, wherein the drive input element comprises a first flanged hub, and the drive output element comprises a second flanged hub.

* * * * *